(12) United States Patent
Hidaka

(10) Patent No.: US 7,435,919 B2
(45) Date of Patent: Oct. 14, 2008

(54) OPERATION DEVICE FOR VEHICLE IGNITION SWITCH

(75) Inventor: Masatake Hidaka, Miyazaki (JP)

(73) Assignee: Honda Lock Mfg. Co., Ltd., Miyazaki (JP)

( * ) Notice: Subject to any disclaimer, the term of this patent is extended or adjusted under 35 U.S.C. 154(b) by 236 days.

(21) Appl. No.: 11/440,455

(22) Filed: May 25, 2006

(65) Prior Publication Data
US 2006/0272932 A1 Dec. 7, 2006

(30) Foreign Application Priority Data
Jun. 2, 2005 (JP) .............................. 2005-163098

(51) Int. Cl.
*H01H 27/06* (2006.01)
(52) U.S. Cl. ..................................... 200/43.08; 70/252
(58) Field of Classification Search ............... 200/11 R, 200/12, 13, 11 J, 43.01, 43.03, 43.04, 43.08, 200/564, 567, 336; 307/9.1–10.1, 10.2, 10.3, 307/10.6; 335/205–207; 70/252, 278.3, 70/279.1, 276, 278.7
See application file for complete search history.

(56) References Cited

U.S. PATENT DOCUMENTS

| | | | | |
|---|---|---|---|---|
| 5,255,547 A | * | 10/1993 | Burr et al. ...................... | 70/252 |
| 5,552,777 A | * | 9/1996 | Gokcebay et al. .......... | 340/5.54 |
| 5,745,026 A | * | 4/1998 | Kokubu et al. ......... | 340/286.01 |
| 6,181,025 B1 | * | 1/2001 | McConnell et al. ........ | 307/10.2 |
| 6,236,121 B1 | * | 5/2001 | Kemmann et al. ......... | 307/10.5 |
| 6,523,377 B1 | * | 2/2003 | Vonlanthen ................ | 70/278.3 |
| 6,573,615 B1 | * | 6/2003 | Asakura et al. ............... | 370/9.1 |
| 6,810,700 B2 | * | 11/2004 | Okuno ........................ | 70/186 |
| 6,904,777 B2 | * | 6/2005 | Kehr ............................ | 70/252 |
| 7,000,441 B2 | * | 2/2006 | Sutton et al. .................. | 70/276 |
| 7,290,416 B2 | * | 11/2007 | Ohtaki et al. ................. | 70/252 |

FOREIGN PATENT DOCUMENTS

JP 2004-058879 2/2004

* cited by examiner

Primary Examiner—Michael A Friedhofer
(74) Attorney, Agent, or Firm—Berenato, White & Stavish

(57) ABSTRACT

In an operation device for a vehicle ignition switch includes a rotational member for changing the switching mode, an operation knob connected with the rotational member while permitting the rotational operation to a LOCK, ON, OFF positions, etc. a block member capable of displacement between a position for permitting or inhibiting the rotation of the operation knob, and a solenoid having a plunger connected for driving the block member to a position permitting the rotation of the operation knob in accordance with ID authentication, generation of abnormal sounds caused by the vibrations of the vehicle and injuries due to wearing is reliably prevented at the ON position by the holding member that abuts against the plunger of the solenoid 17 so as to inhibit the displacement thereof.

2 Claims, 6 Drawing Sheets

OPERATION DEVICE FOR VEHICLE IGNITION SWITCH

FIELD OF THE INVENTION

The present invention concerns an operation device for a vehicle ignition switch including an ignition switch for changing the switching mode in accordance with the rotation of a rotational member, an operation knob connected with the rotational member and capable of rotational operation to a plurality of rotational positions including an ON position, a block member capable of displacement between a position permitting the rotation of the operation knob and a position inhibiting the rotation of the operation knob, and a solenoid having a plunger connected with the block member and driving the block member to the position permitting the rotation of the operation knob in accordance with the current supply upon ID authentication.

DESCRIPTION OF RELATED ART

An operation device for an vehicle ignition switch in which the rotation of the operation is usually inhibited by a block member and the rotational operation of an operation knob is permitted upon driving of the block member for displacement by a solenoid after ID authentication conducted by communication with a portable equipment carried by a vehicle driver has been already known, for example, by JP-A No. 2004-58879.

By the way, in the operation device of the vehicle ignition switch described above, the solenoid is generally maintained in an energized state in order to prevent generation of abnormal sounds caused by vibrations of a vehicle or injuries due to wearing also after the rotational operation of the operation knob to an ON position.

However, when this is applied to vehicles of generating large vibrations such as autobicycles, it is necessary to set a large holding current to be supplied to the solenoid so as to provide large electromagnetic force resisting to such large vibrations for preventing generation of abnormal sounds by vibrations and injuries due to wearing, which increases the amount of heat generation and increases the electric power consumption in the solenoid.

SUMMARY OF THE INVENTION

The present invention has been achieved in view of the foregoing situations and it is an object thereof to provide an operation device for a vehicle ignition switch capable of reliably preventing generation of abnormal sounds caused by vibrations of vehicles and injuries due to wearing at the ON position of the operation knob.

The forgoing object can be attained in accordance with the present invention in an operation device for a vehicle ignition switch including an ignition switch for changing the switching mode in accordance with the rotation of a rotational member, an operation knob connected with the rotational member and capable of rotational operation to a plurality of rotational positions including an ON position, a block member capable of displacement between a position for permitting the rotation of the operation knob and a position for inhibiting the rotation of the operation knob, and a solenoid having a plunger connected with the block member and driving the block member to a position permitting the rotation of the operation knob in accordance with current supply by ID authentication, in which the device includes a holding member for holding the plunger of the solenoid at the operation of the operation knob to the ON position so as to inhibit the displacement thereof after ID authentification.

Further, in a preferred embodiment of the invention, wherein the holding member includes a joint body connecting the rotational member of the ignition switch and the operation knob, and an abutting arm that is formed integrally with the joint body and can abut against the plunger of the solenoid so as to inhibit the axial displacement thereof.

According to the invention, when the operation knob is rotationally operated to the ON position in a state of displacing the block member to a position permitting the rotation of the operation knob by supplying current to the solenoid, since the plunger of the solenoid is held so as to be inhibited from displacement by the holding member, generation of abnormal sounds caused by vibrations of the vehicle and injuries due to wearing can be reliably prevented.

Further, according to the preferred embodiment of the invention constitution of the holding member can be simplified while avoiding increase in the number of parts.

DESCRIPTION OF THE ACCOMPANYING DRAWINGS

A preferred embodiment of the present invention is to be described based on one example of the invention shown in the appended drawings.

PREFERRED EMBODIMENT OF THE INVENTION

Figure 1:
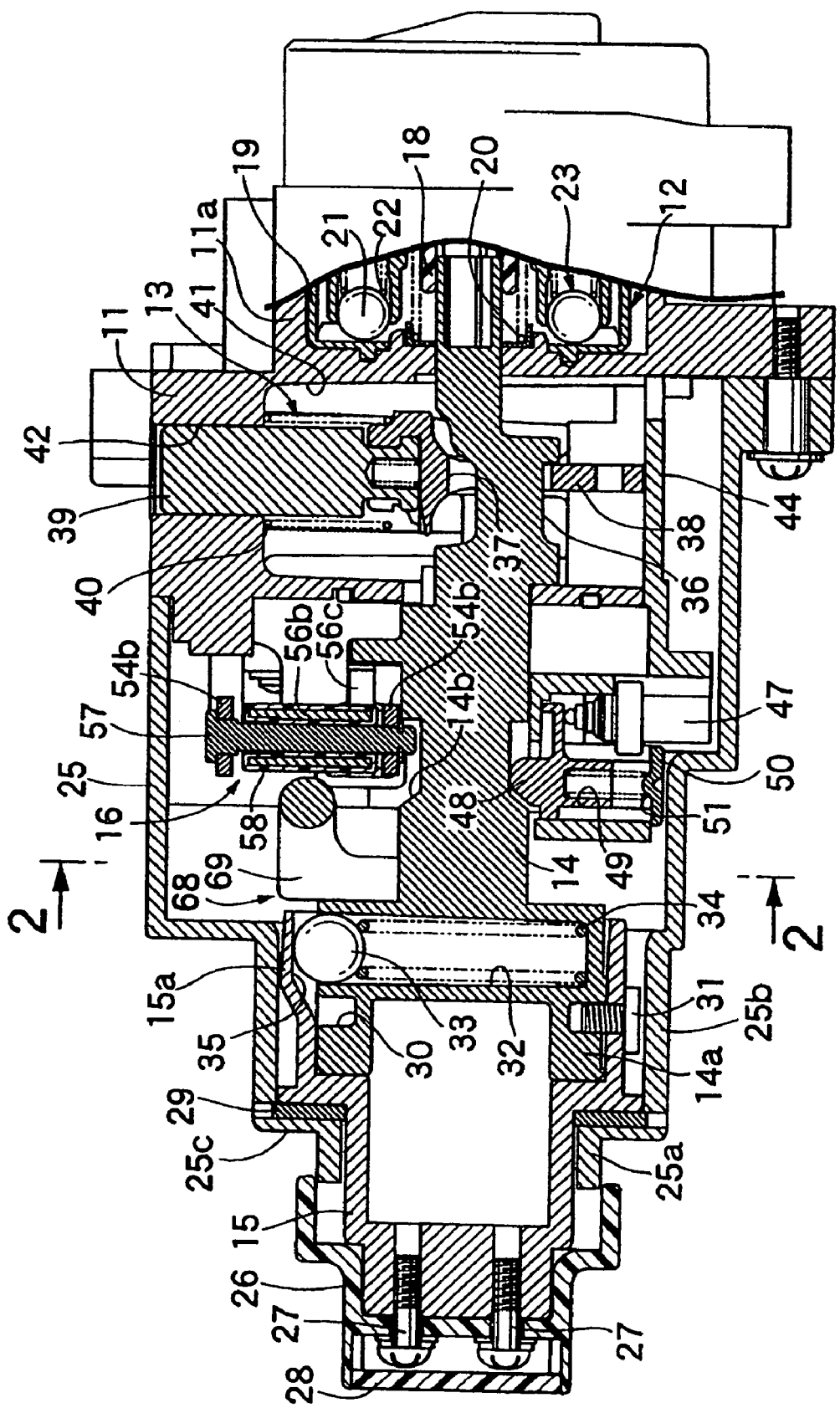
FIG. 1 is a longitudinally cross sectioned side elevational view of a steering lock device in which an operation knob is at an ON position, which is a cross sectional view along line 1-1 of FIG. 2.
Figure 2:
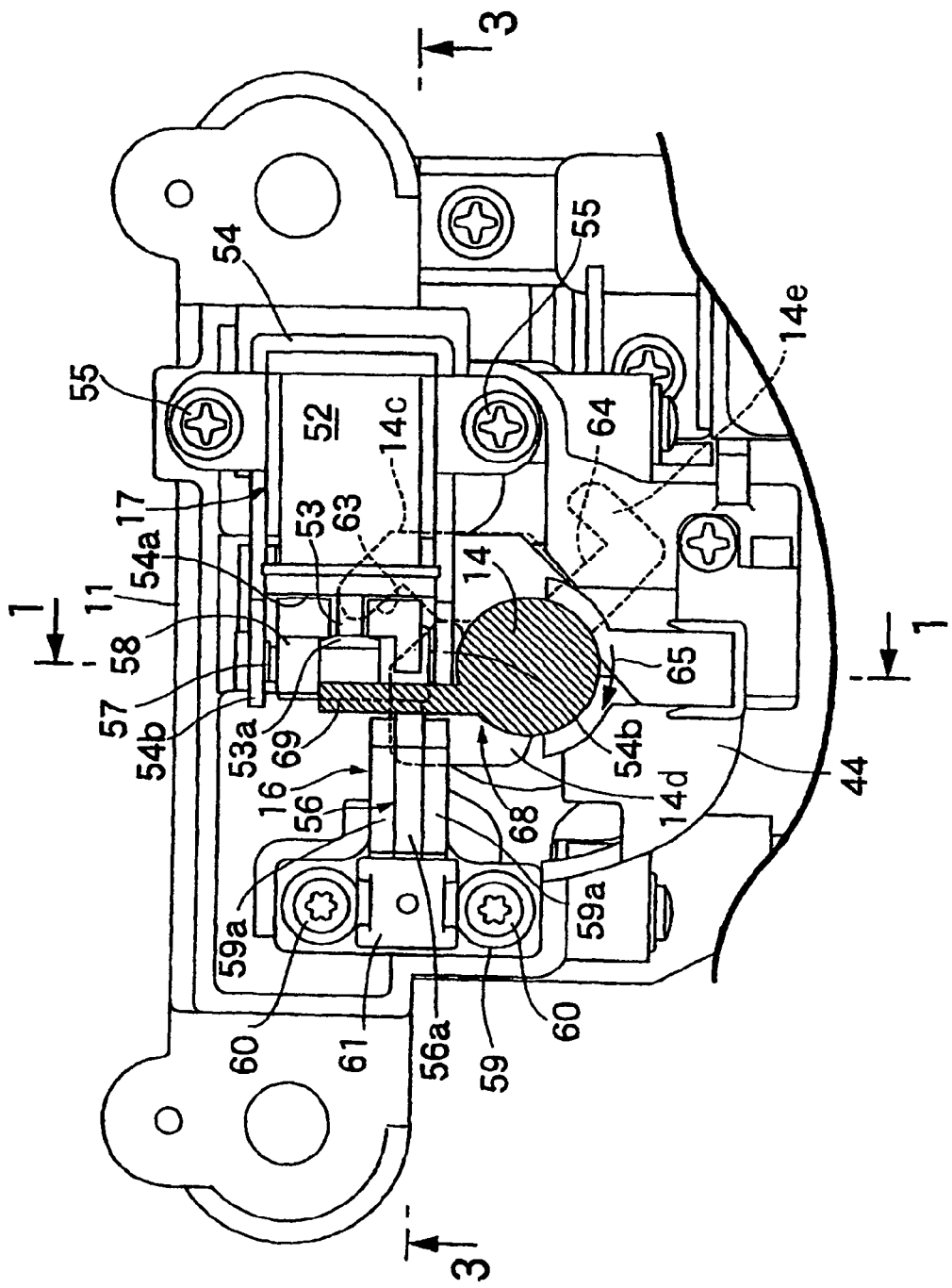
FIG. 2 is a cross sectional view taken along line 2-2 of FIG. 1 in a state of detaching a body cap.

At first, in FIG. 1 and FIG. 2, a steering lock device includes a body 11 made of metal attached to a steering column (not illustrated) of an autobicycle, an ignition switch 12 disposed at the rear end of the body 11 (rightward end in FIG. 1), a locking mechanism 13 capable of switching between a locked state of inhibiting the rotation of a steering shaft (not illustrated) and a lock-released state of permitting the rotation of the steering shaft, an operation knob 15 connected by way of a joint body 14 to the ignition switch 12, a joint body locking mechanism 16 for switching between the state of permitting the rotation of the joint body 14 and the state of inhibiting the rotation of the joint body 14, and a solenoid 17 for driving the joint body locking mechanism 16.

A cylindrical housing portion 11a is disposed integrally to the rear end of the body 11. A switch case 19 of the ignition switch 12 for changing the switching mode in accordance with the rotation of a contact holder 18 as a rotational member is housed in and fixed to the cylindrical housing portion 11a. The joint body 14 is formed basically as a columnar shape having a circular transversal cross sectional shape, and supported rotationally to the body 11 while being permitted for axial sliding operation within a restricted range such that the rear end of the joint body 14 is connected to the contact holder 18 being relatively movably in the axial direction but inhibited from relative rotation around the axis. In addition, the joint body 14 is resiliently biased forward by a spring 20 interposed between it and the ignition switch 12.

The operation knob can be rotationally operated so as to pass a LOCK position, an OFF position, and an ON position successively, and the operation knob 15 is attached to the front end of the joint body 14. That is, the contact holder 18 of the ignition switch 12 and the operation knob 15 are connected by the joint body 14.

A click mechanism 23 having a plurality of balls 21 and springs 22 for resiliently biasing the balls 21 is disposed between the switch case 19 and the contact holder 18 of the ignition switch 12 so as to provide a detent feeling in the rotational operation of the operation knob 15 that passes the LOCK position, the OFF position, and the ON position successively.

A stepped cylindrical body cap 25 extends forward while covering the front-half of the body 11 and is clamped to the body 11. A first cylindrical guide portion 25a and a second cylindrical guide portion 25b of a diameter larger than that of the first cylindrical guide portion 25a are formed coaxially at a front portion thereof, and an annular step 25c is formed between each of them.

The operation knob 15 has a cylindrical large diameter portion 15a to be fitted to the second cylindrical guide portion 25b at the rear portion thereof and the portion 15a is inserted into the first cylindrical guide portion 25a. A knob cover 26 is clamped by means of a pair of screw members 27 and 27 to the front portion of the operation knob 15 protruding from the first cylindrical guide portion 25a. Further, a knob cap 28 is fitted and fixed to the knob cover 26 so as to cover both of the screw members 27, 27. A washer 29 is inserted in the body cap 25 such that it is interposed between the step 25c of the body cap 25 and the front end of the cylindrical large diameter portion 15a.

A diametrically enlarged fitting portion 14a is formed to the front end of the joint body 14 and fitted in the cylindrical large diameter portion 15a at the rear portion of the operation knob 15. An annular groove 30 is formed to the outer periphery of the diametrically enlarged fitting portion 14a, and a plurality of screw members 31, are clamped to the cylindrical large diameter portion 15a of the operation knob 15 with the top ends of the screws being fitted in the annular groove 30. Thus, the operation knob 15 is connected to the front end of the joint body 14 while being inhibited from relative movement in the axial direction. Further, at the rearward of the annular groove 30, a bottomed housing recess 32 is formed to the diametrically enlarged fitting portion 14a along one diametrical line. A ball 33 situates at the open end of the housing recess 32 and a spring 34 is disposed between the ball 33 and the closing end of the housing recess 32 for biasing the ball 33 in the direction protruding from the diametrically enlarged fitting portion 14a. On the other hand, an engaging concave portion 35 capable of engaging one-half of the ball 33 is formed to the inner surface of the cylindrical large diameter portion 15a of the operation knob 15. In a state where the one-half of the ball 33 engages the engaging concave portion 35, the remaining half of the ball 33 engages the open end portion of the bottomed housing recess 32 and the rotational force of the operation knob 15 is transmitted by way of the ball 33 to the joint body 14. However, when an operation torque larger than a predetermined level exerts on the operation knob 15, the ball 33 is enforced entirely into the housing recess 32, by which the operation knob 15 rotates idly making it impossible for the transmission of the rotational operation force from the operation knob 15 to the joint body 14.

Axial forward movement of the operation knob 15 and the joint body 14 is restricted by the abutment of the forward end of the cylindrical large diameter portion 15a of the operation knob 15 against the step 25c of the body cap 25 by way of the washer 29, and axial backward movement of the operation knob 15 and the joint body 14 is restricted by the abutment of the knob cover 26 against the step 25c of the body cap 25.

The locking mechanism 13 is adapted to switch the locked state of inhibiting the rotation of the steering shaft by engagement with the steering shaft, and a lock-released state of permitting the rotation of the steering shaft by releasing the engagement with the steering shaft, and the locking mechanism 13 includes a cam 36 formed at an intermediate portion of the joint body 14, a slider 38 having a through hole 37 for allowing the cam 36 to pass therethrough, a lock pin 39 which is engageable with the steering shaft connected with the slider 31, and a spring 40 located between the body 11 and the slider 38 so as to resiliently bias the lock pin 39 to the side of releasing the engagement with the steering shaft.

In the body 11, a concave portion 41 is formed within a plane perpendicular to the axis of the joint body 14 and opened at one end to the outer surface of the body 11. A slide hole 42 having an axis perpendicular to the axis of the joint body 14 is formed for slidably engaging the lock pin 39, and one end of the slide hole is opened at the other closed end of the concave portion 41 and the other end thereof is opened to the outer surface of the body 11. The slider 38 disposed in the concave portion 41 is supported on the body 11 so as to be slidable within the plane perpendicular to the axis of the joint body 14.

A body cover 44 covering a portion of the body 11 is attached to the body 11. The body cap 25 has such a shape that covers the body cover 44 but exposes the outer surface of the body 11 to the outside at a portion formed with the slide hole 42 and the cap 25 is clamped to the body 11.

The locking mechanism 13 is in a state of disengaging the lock pin 39 from the steering shaft thereby permitting the rotation of the steering shaft in a case where the joint body 14 is at a position other than the LOCK position. In a case where the joint body 14 is at the LOCK position, the locking mechanism 13 is at a rotational position in which the cam 36 moves the slider 38 against the resilient force of the spring 40 so as to engage the lock pin 39 to the steering shaft.

By the way, when the operation knob 15 is pushed inward in a state at the LOCK position or the OFF position, a transmission demand signal is sent from an autobicycle, and a portable equipment carried by an autobicycle rider transmits a normal ID signal in accordance with the reception of the transmission demand signal, to conduct ID authentication, and the operation of pushing the operation knob 15 inward is detected by a stroke switch 47.

A tapered portion 14b having a diameter decreasing toward the backward direction is formed at the outer periphery of the joint body 14 behind the diametrically enlarged fitting portion 14a. A slide member 48 having an axis perpendicular to the axis of the joint body 14 is contained slidably in a guide hole 49 formed in the body cover 44 with the top end being abutted against the tapered portion 14b. Further, a spring 51 that resiliently biases the slide member 48 so as to abut against the tapered portion 14b is located between slide member 48 and a spring receptacle 50 attached to the body cover 44 so as to close the outer end of the guide hole 49.

A stroke switch 47 is attached to the body cover 44 at a position adjacent the slide member 48. The stroke switch 47 is adapted to detect that the slide member 48 has been pushed on the side moving outward along the tapered portion 14b in accordance with the operation of pushing the joint body 14 inward, by which the pushing operation for the joint body 14 is detected by the stroke switch 47.

Figure 3:
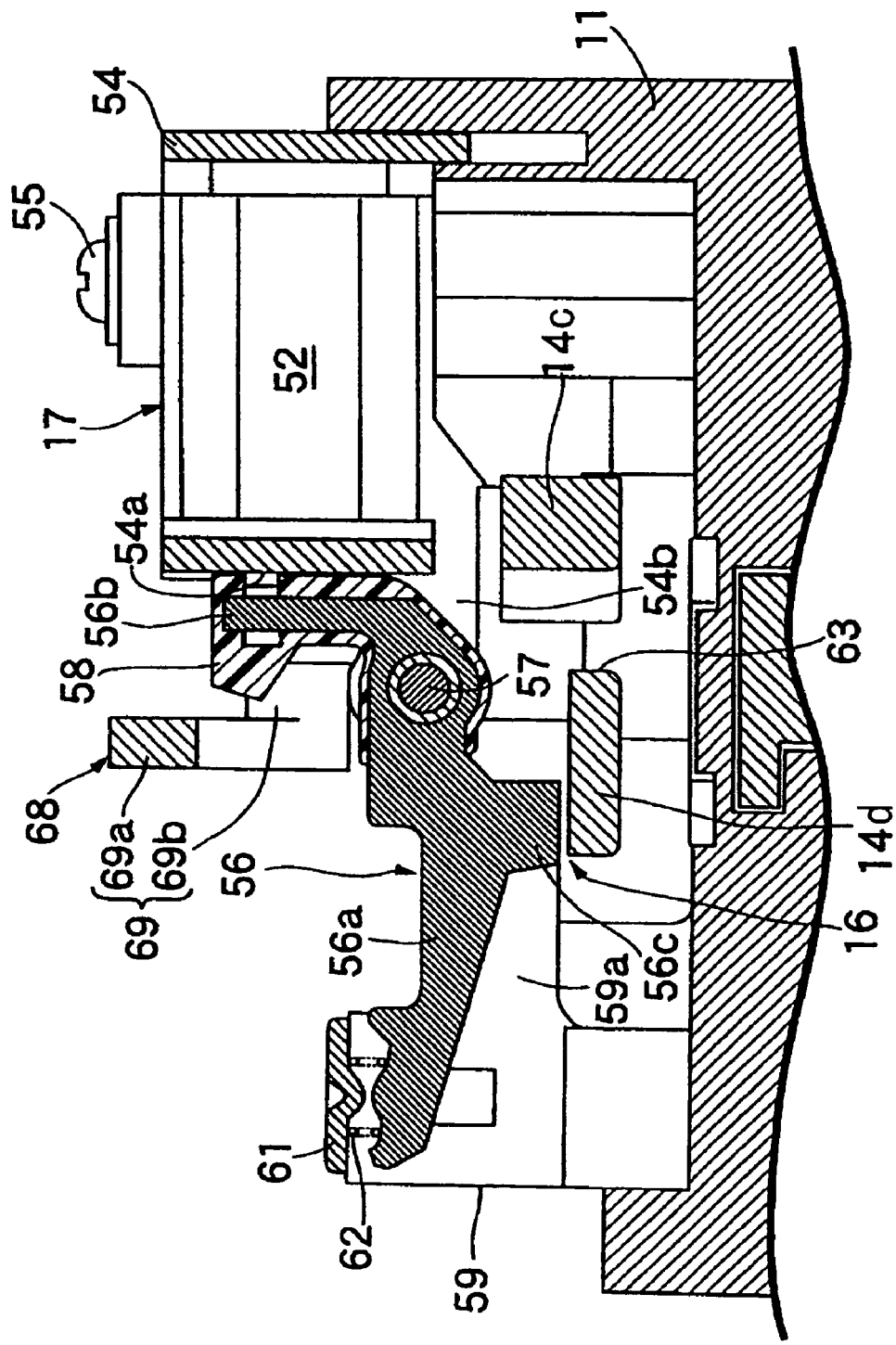
FIG. 3 is a cross sectional view taken along line 3-3 of FIG. 2.
Figure 4:
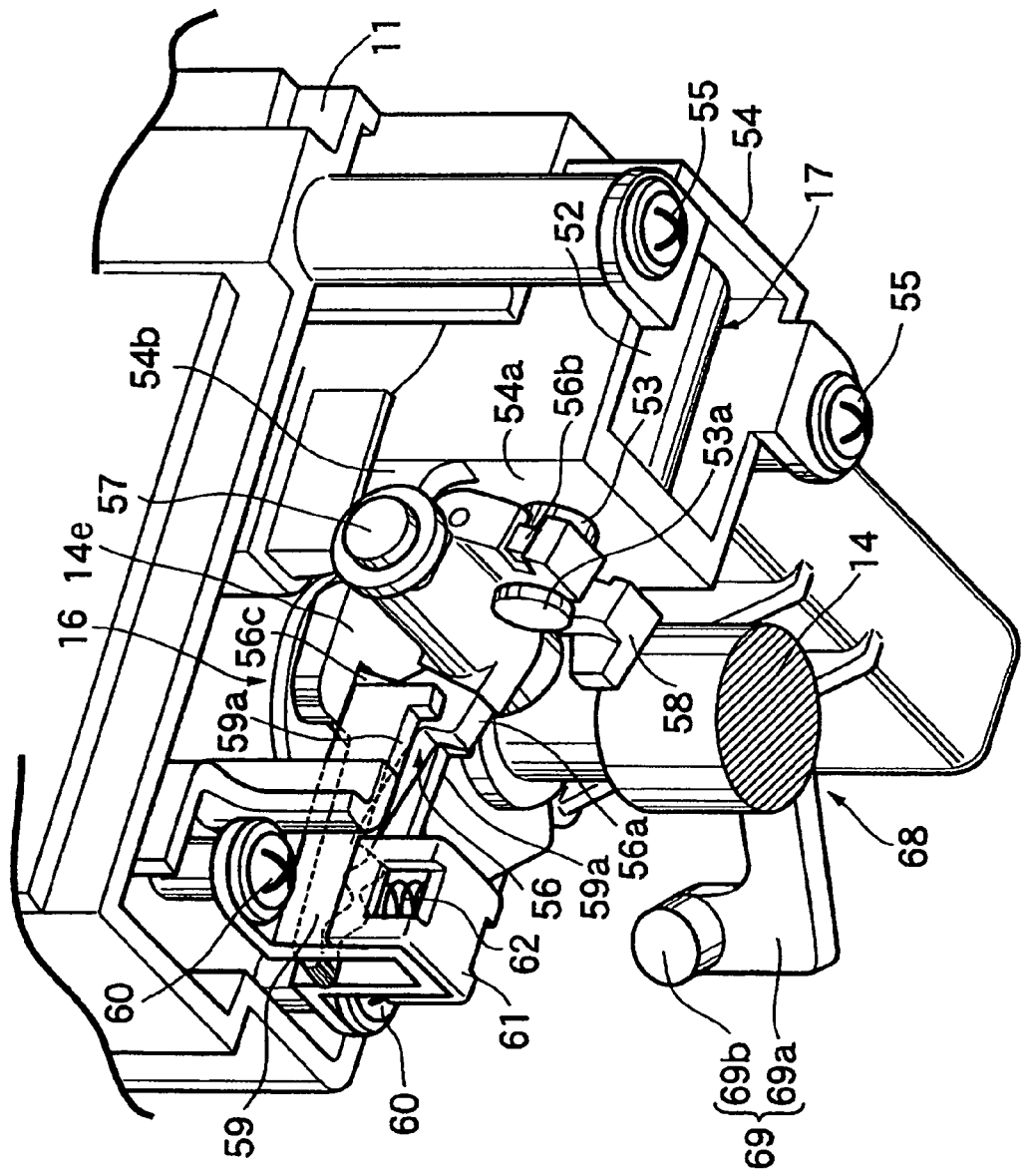
FIG. 4 is a partially cross sectioned perspective view of a main portion for showing a solenoid and a joint body locking mechanism in a state where the operation knob is at a LOCK position.

Referring to FIG. 3 and FIG. 4 together, a solenoid housing 52 of a solenoid 17 is disposed on the side of the joint body 14 and contained in and fixed to a case member 54 that is clamped to the body 11 by a pair of screw members 55 and 55. Then, the solenoid 17 has a plunger 53 that protrudes from one end face 54a of the case member 54 such that it can move along the axis perpendicular to a plane containing the axis of the joint body 14. In a de-energized the plunger 53 is resiliently biased in the direction protruding from one end face 54a of the case member 54, whereas the solenoid 17 in an energized state generates an electromagnetic force to retract the plunger 53 toward the solenoid housing 52. The case member 54 integrally has a pair of support plates 54b, 54b arranged in parallel on both sides of the plunger 53.

The joint body locking mechanism 16 has a block member 56 connected with the plunger 53 of the solenoid 17 such that it can displace between a position for permitting the rotation of the operation knob 15 and a position for inhibiting the rotation of the operation knob 15. The block member 56 is pivotally supported by a support shaft 57 having an axis perpendicular to the axis of the joint body 14 to both of the support plate portions 54b, 54b of the case member 54.

The block member 56 integrally has an arm plate 56a that extends in the form of a plate within a plane perpendicular to the axis of the support shaft 57 and a connection plate 56b that is in contiguous with one end of the arm plate 56a at a right angle and opposed to one end face 54a of the case member 54. The connection portion of the arm plate 56a and the connection plate 56b is supported pivotally by the support shaft 57 to both support plates 54b, 54b of the case member 54.

The connection plate 56b is formed into a substantially U-shaped configuration so as to insert the plunger 53 of the solenoid 17 therethrough, and an engaging flange 53a formed at the top end of the plunger 53 is engageable to the connection plate 56b on the side opposite to the one end face 54a of the case member 54. The connection plate 56b and one end of the arm plate 56a are covered with a cover member 58 made of a synthetic resin.

Further, a support frame 59 having a pair of side plates 59a, 59a formed substantially in an L-shaped configuration in a side elevational view and disposed on both sides of the arm plate 56a is clamped by a pair of screw members 60, 60 to the body 11. A return spring 62 is disposed under compression between the other end of the arm plate portion 56a and a spring receptacle member 61 fixed to the support frame 59 for resiliently biasing the block member 56 rotationally for causing the connection plate 56b to follow the plunger 53 that moves in the direction that tends to protrude from one end face 54a of the case member 54 in the de-energized state of the solenoid 17.

Further, an engaging protrusion 56c protruding toward the body 11 is formed integrally at an intermediate portion of the plate portion 56a of the block member 56. On the other hand, for the joint body 14, a first protrusion 14c, and second and third protrusions 14d and 14e disposed on both sides of the first protrusion 14c in the circumferential direction are protruded such that the protrusion 56c can engage the joint body 14.

Figure 5:
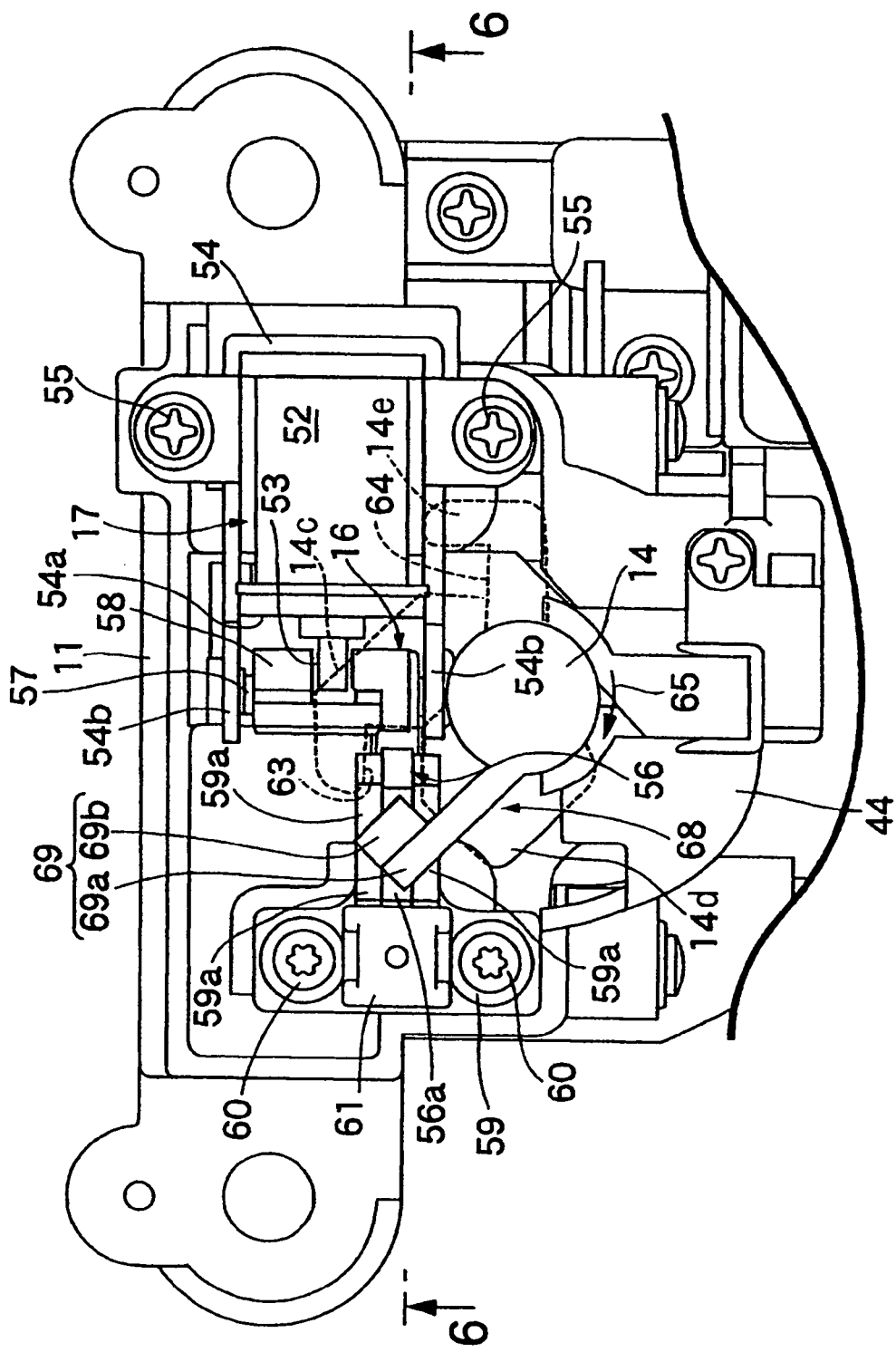
FIG. 5 is a cross sectional view corresponding to FIG. 2 in a state where the operation knob is at an OFF position.
Figure 6:
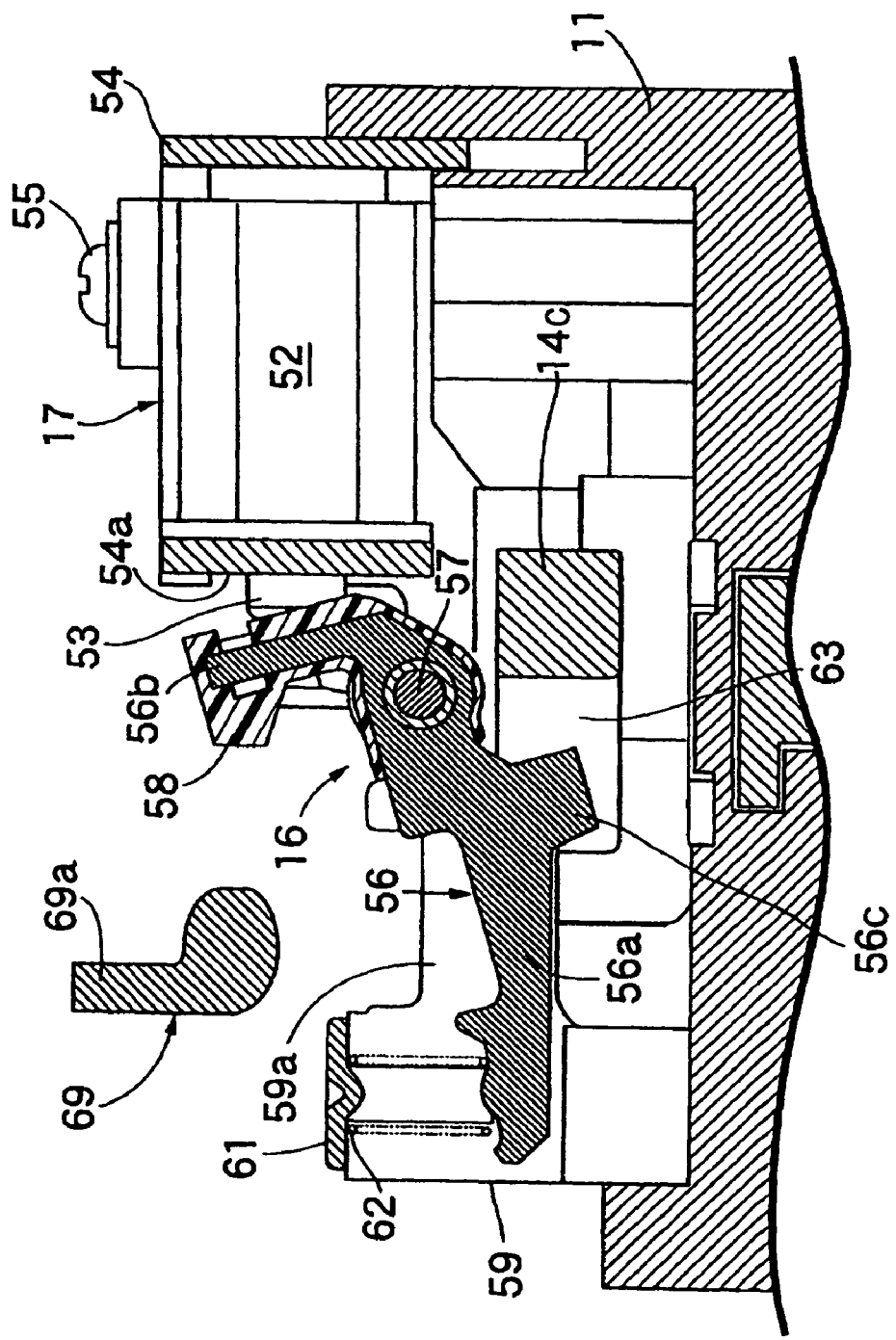
FIG. 6 is a cross sectional view taken along line 6-6 of FIG. 5.

By the way, when the operation knob 15 is rotationally operated from the LOCK position by way of the OFF position to the ON position successively in a state of permitting rotation, the joint body 14 rotates in the rotational direction 65 shown by an arrow in FIG. 2. The first protrusion 14c is formed substantially into an L-shaped configuration as shown in FIG. 5 and FIG. 6 such that a retaining concave portion 63 for the OFF position capable of retaining the engaging protrusion 56c at the OFF position is formed relative to the second protrusion 14d. Further, the third protrusion 14e is formed into a substantially L-shaped configuration such that a retaining concave portion 64 for the LOCK position capable of retaining the engaging protrusion 56C at the LOCK position is formed relative the first protrusion 14c.

Then, when the operation knob 15 is at the LOCK position or the OFF position, and the solenoid 17 is in a de-energized state, the engaging protrusion 56c of the block member 56 is in a state engaging the retaining concave portion 64 for the LOCK position or the retaining concave portion 63 for the OFF position, and the rotational operation of the operation knob 15 is inhibited. Then, when the ID authentication is conducted corresponding to the detection by the stroke switch 47 that the operation knob 15 at the LOCK position or the OFF position has been pushed inward, the solenoid is energized and, as the plunger 53 is retracted correspondingly, the block member 56 is rotationally driven against the resilient force of the return spring 62 so as to disengage the engaging protrusion 56c thereof from the retaining concave portion 64 for the LOCK position or the retaining concave portion 63 for the OFF position, thereby permitting the rotational operation of the joint body 14, that is, the operation knob 15.

By the way, in order not to rotate the operation knob 15 and the joint body 14 toward the OFF position when the operation knob 15 is pushed inward in a state where the operation knob 15 is at the LOCK position, the solenoid 17 is in the de-energized state, and the engaging protrusion 56c of the block member 56 is retained in the retaining concave portion 64 for the LOCK position, the length of the first protrusion 14a along the axis of the joint body 14 is made larger than that for the second or the third protrusion 14b, 14c for maintaining the engaged state with the engaging protrusion 56c also upon pushing operation to the operation knob 15.

Further, when the operation knob is pushed inward in a state where the operation knob 15 is at the OFF position, the solenoid 17 is in the de-energized state, and the engaging protrusion 56c of the block member 56 engages the retaining concave portion 63 for the OFF position, the second protrusion 14b moves axially till a position capable of releasing the engagement with the engaging protrusion 56c. The body 11 is formed so as to inhibit the rotation of the operation knob 15 and the joint body 14 from the OFF position to the ON position while pushing the operation knob 15 as it is.

In accordance with the invention, the plunger 53 of the solenoid 17 that is in the energized state at the operation of the operation knob 15 to the ON position after the ID authentication is held by a holding member 68 for inhibiting the displacement thereof.

The holding member 68 has the joint body 14 and an abutting arm 69 that is disposed integrally with the joint body 14 such that it can abut against the plunger 53 of the solenoid 17 in the energized state to inhibit the axial displacement thereof. The abutting arm 69 has a disk-shaped abutment portion 69b formed at the top end of the arm 69a that is integrally protruded outward from the outer circumference of the joint body 14 and formed substantially in an L-shaped configuration. The abutting arm 69 is formed integrally to the joint body 14. When the operation knob 65 and the joint body 14 rotate to the ON position, the abutting portion 69b abuts from the outside against the engaging flange 53a at the top end of the plunger 53 which is retracted into the case member 54 under the energized state.

Referring to the operation of this embodiment, in a case where the operation knob 15 is at the LOCK position or the OFF position, and the solenoid 17 is in a de-energized state, the engaging protrusion 56c of the block member 56 is in a state engaging the retaining concave portion 64 for the LOCK position, or engaging the retaining concave portion 63 for the OFF position and the rotational operation of the operation knob 15 is inhibited. Then, when ID is authenticated in accordance with the detection by the stroke switch 47 that the operation knob 15 in the state described above has been pushed inward, the solenoid 17 is energized. Since the solenoid 17 in the energized state drives the block member 56 rotationally so as to disengage the engaging protrusion 56c from the retaining concave portion 64 for the LOCK position or the retaining concave portion 63 for the OFF position to permit the rotational operation of the joint body 14, that is, the operation knob 15, when the operation knob 15 is driven rotationally from the LOCK position or the OFF position to the ON position, the plunger 53 of the solenoid 17 in the energized state is held and inhibited from displacement by the holding member 68.

Accordingly, generation of abnormal sounds caused by vibrations of the autobicycle and injuries due to wearing can be prevented reliably by holding the plunger 53, while restricting the current supplied to the solenoid 17 to a relatively small amount thereby suppressing the amount of heat generation and avoiding increase in the consumption power.

Further, since the holding member 68 merely comprises the joint body 14 and the abutting arm 69 formed integrally with the joint body 14 that can abut against the plunger 53 of the solenoid 17 in the energized state so as to inhibit the axial displacement, constitution of the holding member 68 can be simplified to decrease the required number of parts.

The holding state of the plunger 53 by the holding member 68, that is, the ON position of the joint body 14 is maintained by the click mechanism 23 equipped in the ignition switch 12.

Then, when the operation knob 15 is returned from the ON position to the OFF position, the holding state of the plunger 53 by the holding member 68 is released. In a state where a rider rides on the autobicycle, the energized state of the solenoid 17 is maintained by intermittent communication relative to a portable equipment curried by the rider, and the block member 56 is at a position for releasing the engagement with the joint body 14. When the operation knob 15 is rotated further from the OFF position to the LOCK position successively, the lock pin 39 of the locking mechanism 13 engages the steering shaft to lock the steering handle.

Further, when a rider who carries about the portable equipment leaves the autobicycle in a state of setting the operation knob 15 at the OFF position or the LOCK position, since the intermittent communication is disconnected, current supply to the solenoid 17 is interrupted, the block member 56 is rotated by the resilient force of the return spring 62, the engaging protrusion 56c of the block member 56 engages the retaining concave portion 63 for the OFF position or the retaining concave portion 64 for the LOCK position to inhibit the rotational operation of the operation knob 15.

While the descriptions have been made to the preferred embodiment of the invention, the invention is not restricted to the embodiment described above but various design changes are possible without departing the gist of the invention.

For example, in the embodiment described above, current supply to the solenoid 17 is maintained while the rider who carries about the portable equipment is present near the autobicycle, but it may also be adopted such that the current is supplied to the solenoid 17 only for a predetermined period of time after the ID authentication has been conducted based on the pushing of the operation knob 15 at the LOCK position or the OFF position, but the current supply to the solenoid 17 is not continued at the ON position of the operation knob 15. In this case, the plunger 53 of the solenoid in the de-energized state can be kept at the same position as that in the energized state by the holding member 68 according to the invention, thereby capable of preventing generation of abnormal sounds caused by the vibrations of the autobicycle or injuries due to wearing.

Further, the invention is applicable not only to the autobicycles but also generally to vehicles including four wheeled automobiles.

What is claimed is:

1. An operation device for a vehicle ignition switch including an ignition switch (12) for changing a switching mode in accordance with rotation of a rotational member (18), an operation knob (15) connected with the rotational member (12) and capable of rotational operation to a plurality of rotational positions including an ON position, a block member (56) capable of displacement between a position for permitting the rotation of the operation knob (15) and a position for inhibiting the rotation of the operation knob (15), and a solenoid (17) having a plunger (53) connected with the block member (56) and driving the block member (56) to a position permitting the rotation of the operation knob (15) in accordance with current supply by ID authentification, in which the device includes a holding member (68) for holding the plunger (53) of the solenoid (17) at the operation of the operation knob (15) to the ON position so as to inhibit the displacement thereof after ID authentication, wherein the holding member (68) has a rotational body that rotates along with the rotational operation of the operation knob (15), and an abutting portion provided integrally with the rotational body and capable of abutting against the plunger (53) of the solenoid (17)so as to inhibit axial displacement thereof.

2. An operation device for a vehicle ignition switch according to claim 1, wherein the rotational body has a joint body (14) connecting the rotational member (18) of the ignition switch (12) and the operation knob (15), and the abutting portion has an abutting arm (69) that is formed integrally with the joint body (14).

* * * * *